United States Patent
Vander Lind et al.

(10) Patent No.: US 9,212,032 B2
(45) Date of Patent: Dec. 15, 2015

(54) EXTRUDED DRUM SURFACE FOR STORAGE OF TETHER

(71) Applicant: Google Inc., Mountain View, CA (US)

(72) Inventors: Damon Vander Lind, Alameda, CA (US); Brian Hachtmann, San Martin, CA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 14/144,049

(22) Filed: Dec. 30, 2013

(65) Prior Publication Data

US 2015/0184638 A1   Jul. 2, 2015

(51) Int. Cl.
| | |
|---|---|
| *B66D 1/30* | (2006.01) |
| *B64C 39/02* | (2006.01) |
| *B64F 3/00* | (2006.01) |
| *B21C 23/00* | (2006.01) |
| *B29C 47/00* | (2006.01) |
| *F03D 9/00* | (2006.01) |
| *B65H 75/26* | (2006.01) |
| *B65H 75/44* | (2006.01) |

(52) U.S. Cl.
CPC . *B66D 1/30* (2013.01); *B21C 23/00* (2013.01); *B29C 47/00* (2013.01); *B64C 39/022* (2013.01); *B64F 3/00* (2013.01); *B65H 75/265* (2013.01); *B65H 75/4405* (2013.01); *B65H 75/4415* (2013.01); *F03D 9/002* (2013.01); *B65H 2701/528* (2013.01)

(58) Field of Classification Search
CPC .... B66D 1/30; B66D 1/36; B66D 2700/0191; B65H 75/265; Y02E 10/70
USPC ............................................ 242/602–602.3
See application file for complete search history.

(56) References Cited

U.S. PATENT DOCUMENTS

| | | | | | |
|---|---|---|---|---|---|
| 2,204,938 | A | * | 6/1940 | Le Bus | 242/602.1 |
| 2,599,926 | A | * | 6/1952 | Le Bus | 242/602.2 |
| 2,620,996 | A | * | 12/1952 | Le Bus | 242/602.2 |
| 2,633,629 | A | * | 4/1953 | Crookston | 29/894.2 |
| 2,892,598 | A | * | 6/1959 | Dudley | 242/602.2 |
| 2,954,702 | A | * | 10/1960 | Petersen | 242/155 BW |
| 4,034,932 | A | | 7/1977 | Ferch | |
| 4,453,309 | A | * | 6/1984 | Shirk | 29/884 |

(Continued)

FOREIGN PATENT DOCUMENTS

WO     2012/155724     11/2012

OTHER PUBLICATIONS

Makani Power, "How does it work?" http://makanipower.com/how-does-it-work, accessed Nov. 1, 2013, 3 pages.

(Continued)

*Primary Examiner* — Zachary Kuhfuss
(74) *Attorney, Agent, or Firm* — McDonnell Boehnen Hulbert & Berghoff LLP.

(57) ABSTRACT

A drum for storing an electrically conductive tether having a first end secured to an aerial vehicle and a second end secured to a ground station that includes a drum frame rotatable about a drum axis, a drum surface positioned over the drum frame comprising a spiral extrusion wrapped around the drum frame, wherein the extrusion has a cross-section having an upper surface that is shaped to conform to an outer surface of the electrically conductive tether, and wherein the extrusion is adapted for dissipating heat generated through a transfer of electricity from the aerial vehicle to a ground station through the electrically conductive tether.

20 Claims, 9 Drawing Sheets

(56) References Cited

U.S. PATENT DOCUMENTS

| | | | |
|---|---|---|---|
| 4,465,161 A * | 8/1984 | Ohta et al. | 254/372 |
| 5,067,665 A * | 11/1991 | LoStracco et al. | 242/118.32 |
| 6,327,994 B1 | 12/2001 | Labrador | |
| 6,443,383 B1 * | 9/2002 | Stasny et al. | 242/388 |
| 7,504,741 B2 | 3/2009 | Wrage et al. | |
| 7,672,761 B2 | 3/2010 | Wrage et al. | |
| 7,971,545 B2 | 7/2011 | Wrage | |
| 8,056,490 B2 | 11/2011 | Wrage | |
| 8,888,049 B2 * | 11/2014 | Vander Lind | 244/153 R |
| 2010/0295303 A1 | 11/2010 | Lind et al. | |
| 2011/0260462 A1 | 10/2011 | Vander Lind | |
| 2012/0086210 A1 * | 4/2012 | Gray | 290/55 |
| 2012/0104763 A1 | 5/2012 | Lind | |
| 2013/0221154 A1 | 8/2013 | Vander Lind et al. | |
| 2013/0221679 A1 | 8/2013 | Vander Lind | |

OTHER PUBLICATIONS

Makani Power, "What is Airborne Wind Power?" http://makanipower.com/what-is-airborne-wind, accessed Nov. 1, 2013, 2 pages.

* cited by examiner

EXTRUDED DRUM SURFACE FOR STORAGE OF TETHER

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

In one aspect, a drum for storing an electrically conductive tether having a first end secured to an aerial vehicle and a second end secured to a ground station is provided. The drum includes a drum frame rotatable about a drum axis and a drum surface positioned over the drum frame that is constructed as a spiral extrusion wrapped around the drum frame. The extrusion has a cross-section having an upper surface that is shaped to conform to an outer surface of the electrically conductive tether to cradle and protect the tether. The cross-section is shaped to allow for the flow of air between adjacent wraps of the spiral extrusion for dissipating heat generated through a transfer of electricity from an aerial wing to a ground station through the electrically conductive tether.

In another aspect, a drum for storing an electrically conductive tether having a first end secured to an aerial vehicle and a second end secured to a ground station is provided including a drum frame rotatable about a drum axis, a drum surface positioned over the drum frame comprising a spiral extrusion wrapped around the drum frame, wherein the extrusion has a cross-section having an upper surface that is shaped to conform to an outer surface of the electrically conductive tether, and wherein the extrusion is adapted for dissipating heat generated through a transfer of electricity from the aerial vehicle to the ground station through the electrically conductive tether.

In another aspect, an airborne wind turbine system is provided including an aerial vehicle, an electrically conductive tether having a first end secured to the aerial vehicle and a second end secured to a ground station, a drum frame rotatable about a drum axis, the drum frame positioned with the ground station, a drum surface positioned over the drum frame comprising a spiral extrusion wrapped around the drum frame, wherein the extrusion has a cross-section having an upper surface that is shaped to conform to an outer surface of the electrically conductive tether, and wherein the extrusion is adapted for dissipating heat generated through a transfer of electricity from the aerial vehicle to the ground station through the electrically conductive tether.

In another aspect, a method of forming a drum for storing an electrically conductive tether is provided, including the steps of positioning a drum frame rotatable about a drum axis in front of an outlet of an extrusion machine, extruding an extrusion material over the drum frame to form an extrusion, bending the extrusion over the drum frame as the drum frame is rotating to form a drum surface that is a spiral extrusion wrapped around the drum frame, providing the extrusion with a cross-section having an upper surface that is shaped to conform to an outer surface of the electrically conductive tether, shaping the cross-section to allow for the flow of air between adjacent wraps of the spiral extrusion for dissipating heat generated through a transfer of electricity from an aerial vehicle to a ground station through the electrically conductive tether; and securing the spiral extrusion to the drum frame.

In a further aspect, means for dissipating heat generated through the transfer of electricity from an aerial vehicle to a ground station through an electrically conductive tether wound onto a drum is provided.

These as well as other aspects, advantages, and alternatives, will become apparent to those of ordinary skill in the art by reading the following detailed description, with reference where appropriate to the accompanying drawings.

DETAILED DESCRIPTION

Figure 1:
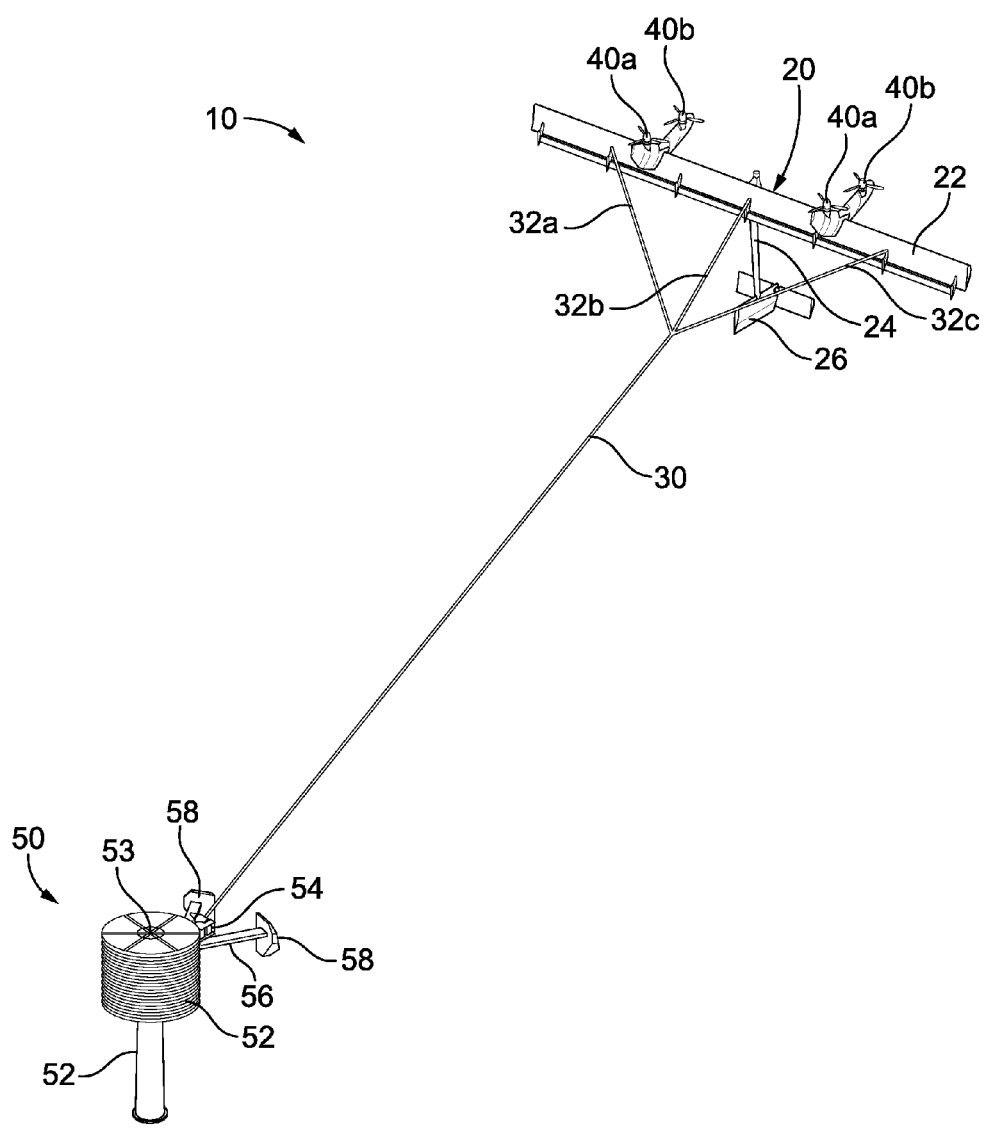
FIG. 1 is a perspective view of an airborne wind turbine 10 including aerial vehicle 20 attached to a ground station 50 with an electrically conductive tether 30, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing are used to generate power by slowing the wing down. Air moving across the turbine blades forces them to rotate, driving a generator to produce electricity. The aerial vehicle is connected to a ground station via an electrically conductive tether that transmits power generated by the aerial vehicle to the ground station, and on to the grid.

When it is desired to land the aerial vehicle, the electrically conductive tether is wound onto a spool or drum in the ground station and drum is rotated to reel in the aerial vehicle towards a perch on the ground station. Prior to landing on the perch, the aerial vehicle transitions from a flying mode to a hover mode. The drum is further rotated to further wind the tether onto the drum until the aerial vehicle comes to rest on the perch.

The electrically conductive tether may be constructed of a carbon fiber core surrounded by aluminum conductors. The carbon fiber core and aluminum conductors may be positioned within an outer insulation. As noted above, the tether transmits electricity from the aerial vehicle to the ground station through the aluminum conductors, and care must be taken to protect the tether. In an embodiment, the tether has a length of 500 meters, which must be carefully wound onto the drum, without crushing or damaging the tether. The tether tends to be very strong in tension, but fragile in storage as the insulation and wire can be compressed. Therefore it would be desirable to provide a drum surface that reduces the stress concentrations and protects the tether as it is wound onto the drum.

Furthermore, as noted above, the tether transmits electricity from the aerial vehicle to the ground station through the aluminum conductors, which generates a lot of heat. It is important to cool the tether while on the drum, as the conductors in the tether at this location are still producing heat. On a drum which has a continuous surface and in particular, one with tightly packed positioning of the successive lengths of tether, there is little natural convection to cool the tether, and that convection that does occur builds up a boundary layer of hot air that impinges on other portions of the tether, further insulating it from cold air. Therefore it would be desirable to provide a drum capable of dissipating heat from the surface of the drum where the tether is stored.

In the disclosed exemplary embodiments, the drum may be either vertical or horizontal (or combination thereof) and is capable of winding the tether onto the drum with a desired spacing between successive lengths of the tether. Furthermore, particularly in the case of a vertical drum, the disclosed exemplary embodiments provide a drum surface that serves to prevent the tether from "slipping" down the surface of the drum and maintains the desired spacing between the successive lengths of the tether as the tether is stored on the drum.

In some embodiments, the tether may be on the order of 500 meters in length, although shorter or longer tethers may be used as well. The tether is wound onto the drum without winding successive lengths of tether onto one another (unlike a fishing reel where the line is wrapped over itself). As a result, the drum may need to be quite large to accommodate the entire length and weight of the tether. The drum must also have sufficient strength to withstand the compressive forces of the tether caused by the weight and tension of the tether. However, a heavy drum is undesirable for a number of reasons, including material cost and requiring the aerial wing to overcome the drum inertia of a fully wound drum at launch. Accordingly, the example embodiments provide a strong, but lightweight drum that is easy to manufacture.

In an example embodiment, a drum is provided onto which the tether is wound. The drum incorporates a helical or spiral set of circular grooves on the drum surface so that the tether does not have a pressure concentration at the point of contact between the tether and the surface of the drum. Winding the tether onto a drum having a non-circular cross-section, or having a flat surface, results in high stress concentrations at the point of contact between the tether and the drum surface, which may damage the tether. The surface of the drum may be formed of an extrusion that is wound onto a drum frame. The extrusion may be provided with a cross-section having grooves that conform to, and cradle, the tether. In other words, the outer surface of the extrusion may be provided with a geometry that conforms to the outer surface of the tether. Therefore, if the outer surface of the tether is round, then the outer surface of the extrusion may have a corresponding round surface which the tether will rest in. Similarly, if the surface of the tether is oval, and more aerodynamic, the corresponding surface of the extrusion may be formed to match the oval surface of the tether.

The extrusion may be formed of extruded aluminum. Aluminum is a strong, lightweight material that is easily extruded. However, in some embodiments a composite or plastic material could be used. In fact, the extrusion may be wound over the drum frame as is it exits the extruder using a tube roller. Because of limitations on the size of the extrusion machines, the extrusion for the drum surface may be constructed of a number of separate lengths of extrusions joined at their respective ends to form a continuous spiral groove about the surface of the drum.

The use of an aluminum extrusion for the surface of the drum has a number of advantages. For example, an extruded section is inexpensive to manufacture because extrusions are faster and less wasteful of material than machined surfaces. In addition, the extrusion may have a variety of cross-sections beneath the cradle portion of the extrusion, which would be difficult or impossible to create through other manufacturing methods.

For example, a hollow box beam shape may be used in order to provide high rigidity in bending as well as torsion. The inside of the box is hollow, minimizing the amount of material required. Alternately, an I-beam layout may be used for simplicity, likely being the most inexpensive option. Furthermore, an M-shape cross-section may be used, and it may incorporate a locking mechanism, in which each wrap of the extrusion is able to fit into a slot on the previous wrap. For example, when using the extrusion with an M-shape cross-section, the locking mechanism is in the lower left of the M-shape, in the form of a groove into which the lower right portion of the M-shape of the adjacent wrap of the extrusion would fit into. In some embodiments, the locking mechanism could include a press fit, where the lower right portion of the M-shape is press fit into the groove on the lower left side of M-shape in the adjacent wrap of the extrusion, tightly fitting together adjacent wraps of the extrusion.

In some embodiments, the sides of the extrusion may be scalloped or drilled such that air can move through the gaps between adjacent wraps of the extrusion. Because the shape of the extrusion extends above the drum frame and heat is only generated by the tether, buoyancy convection will drive air flow between the gaps between adjacent wraps of the extrusion and up the outside and over the tether, bringing new air into the boundary layer to help cool the tether. In some embodiments, the extrusion may have an asymmetrical cross-section so as to help favor inward flow of air.

While many drum frames are possible, a simple drum frame may be constructed of steel tubes or plates over which the extrusion is wrapped. For example the tubes could extend in a direction parallel to the axis of the drum, and be attached to spokes rotatable about the axis of the drum. At each tube, the extrusion might be welded, riveted, taped, bolted, glued, or attached through some other means to hold the extrusion in place on the drum frame. The extrusion itself is made thick enough and of high stiffness profiles so that only a relatively small number of framing tubes may be used for the drum frame. The extrusion actually provides a lightweight eggshell-like surface capable of withstanding significant compressive forces, eliminating the need for a strong, heavy drum frame. In addition, because of the minimal drum frame members required and the ability to provide gaps between adjacent wraps of the extrusion, air may flow all the way through the drum frame from one side to the other to cool the extrusion and the tether.

A levelwind may be used to guide the tether onto the extrusion. In some embodiments, the levelwind may be inset within the drum. In designs with the levelwind winding onto a constant helix, the drum requires cut-outs to fit the levelwind, as the levelwind comprises large bearings which must carry tether loads during flight. However, in an embodiment using an extrusion for the drum surface, the levelwind may be positioned above the drum. The levelwind is above the majority of the drum, with the end of the extrusion angled to create a variable helix at the lead-in of the tether while winding the tether onto the drum. With this configuration with the levelwind positioned above the drum, the drum does not need as large as it would need to be if the levelwind was inset within the drum. This has the added advantage of making the drum reel-in and reel-out far more consistent and enables vastly higher speeds of deployment.

Another benefit of using an extrusion for the drum surface is that different extrusion segments could be used to form the extrusion. For example, in some embodiments the end of the tether nearest the aerial vehicle may be faired to be more aerodynamic, or shaped differently from the other end of the tether, which may be circular. The aerodynamics of the tether is far more important near the aerial vehicle than it is near the ground. As a result, a first segment of the extrusion could be shaped to cradle the end of the tether nearest the ground, and the second segment of the extrusion could be shaped to cradle the differently shaped faired portion of the tether nearest the aerial vehicle. In addition, the spacing between adjacent wraps of the first segment of the extrusion could be closer together than the spacing between adjacent wraps of the second segment of the extrusion if desired. Further, as noted above the lead-in of the extrusion could be angled outwardly at the end of the drum to provide a lead-in for the levelwind and tether. This is easily done when using an extrusion.

Furthermore, the levelwind may take advantage of the shape of the extrusion to properly wind the tether onto the extrusion. As an example, in embodiments having a constant spacing between adjacent grooves, the levelwind could include an extension guide that rides in an adjacent or forward groove of the extrusion next to where the tether is being wound to insure the levelwind is properly winding the tether onto the drum. The extension guide is used to guide the levelwind along as the tether is wound onto the drum.

Alternately, the extrusion could have an upwardly extending guide rail and the levelwind could include an extension having a slot that fits over the guide rail to properly guide the levelwind along as the tether is wound onto the drum.

The disclosed embodiments allow for an inexpensive construction method for creating a relatively complex shape that solves a difficult requirement requiring high tolerances and high load bearing capability. The drum having an extruded surface is cheap, lightweight, strong, and may be quickly built and prototyped.

2. Illustrative Airborne Wind Turbines

Figure 2:
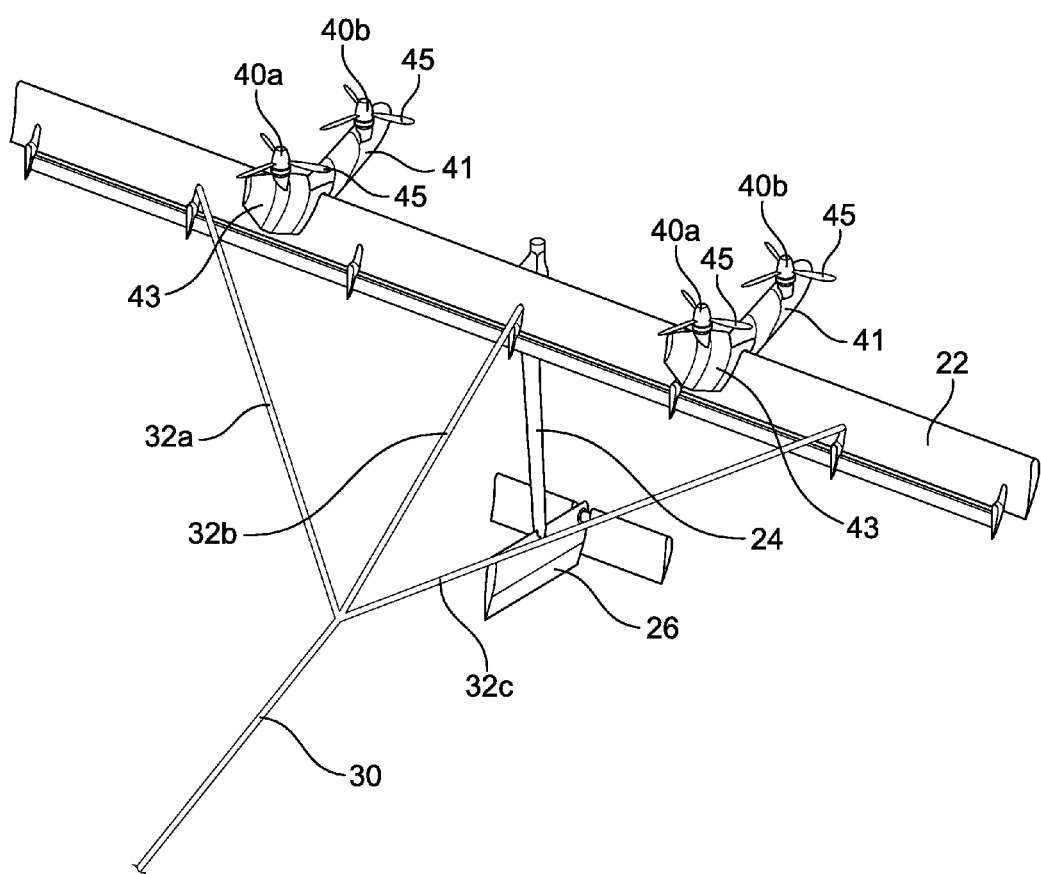
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridal 32a, 32b, and 32c. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3A:
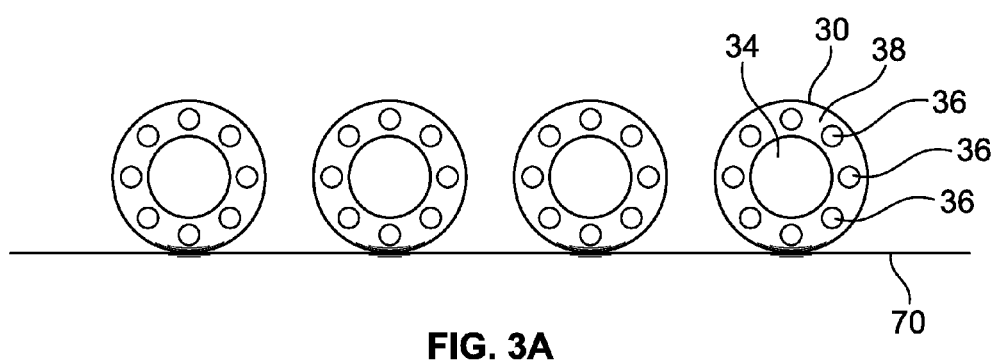
FIG. 3A is a cross-sectional side view of adjacent wraps of tether 30 positioned on a flat drum surface 70, according to an example embodiment.
Figure 3B:
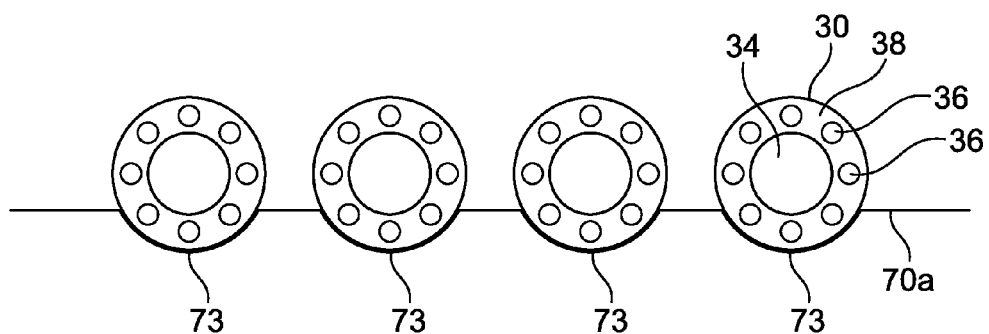
FIG. 3B is a cross-sectional side view of adjacent wraps of tether 30 positioned within grooves 73 on drum surface 70a, according to an example embodiment.

As shown in FIGS. 3A and 3B, the electrically conductive tether 30 may be constructed of a carbon fiber core 34 surrounded by aluminum conductors 36. The carbon fiber core 34 and aluminum conductors 36 may be positioned within an outer insulation 38. As noted above, the tether 30 transmits electricity from the aerial vehicle 20 to the ground station 50 through the aluminum conductors 36, and care must be taken to protect the tether 30 as it is wrapped onto the drum. In an embodiment, the tether 30 has a length of 500 meters, which must be carefully wound onto the drum, without crushing or damaging the tether 30. The tether 30 tends to be very strong in tension, but fragile in storage as the insulation 38 and aluminium conductors 36 can be compressed. In an example embodiment, the diameter of the carbon fiber core 24 is 14 millimeters and the diameter of the tether is 24 millimeters.

As illustrated in FIG. 3A, when tether 30 is wound onto a drum having a flat surface 70, compression at the point of contact between the outer surface of tether 30 and flat drum surface 30 causes undesirable stress concentrations in the tether 30. As shown in FIG. 3B, the present embodiments provide a drum surface 70a having grooves 73 that conform to the cross-sectional shape of the outer surface of tether 30, thereby spreading out the contact between the tether 30 and the drum surface 70a and reducing stress concentrations in the tether 30.

3. Drums Having an Extruded Surface

In the disclosed exemplary embodiments and as shown in Figures below, a drum 140 is provided that may be either oriented vertically or horizontally (or combination thereof) and is capable of winding the tether 30 onto the drum 140 with a desired spacing between successive lengths of the tether 30. Furthermore, particularly in the case of a vertical drum, the disclosed exemplary embodiments provide a drum surface 70a that serves to prevent the tether 30 from "slipping" down the surface of the drum 70a and maintains the desired spacing between the successive lengths of the tether 30 as the tether 30 is stored on the drum 140.

The drum 140 incorporates a helical or spiral set of circular grooves 73 on the drum surface so that the tether 30 does not have a pressure concentration at the point of contact between the tether 30 and the drum surface 70a. The surface of the drum is formed of an extrusion that is wound onto a drum frame, such as extrusions 100, 110, or 120 shown in FIGS. 4A-4C. The extrusion is provided with a cross-section having grooves 73 that conform to, and cradle, the tether 30. Thus, the outer surface of the extrusion may be provided with a geometry that conforms to the outer surface of the tether 30.

Figure 4A:
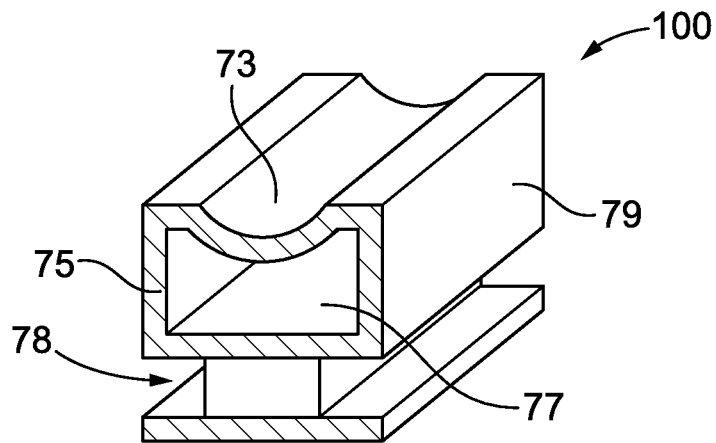
FIG. 4A is a perspective cross-sectional view of extrusion 100, according to an example embodiment.

FIG. 4A is an example extrusion 100 having cross-section 75 that may be used as the extrusion that is wrapped about a drum frame. In particular, extrusion 100 has a hollow box beam shape may be used in order to provide high rigidity in bending as well as torsion. The inside of the box has a hollow portion 77, minimizing the amount of material required for the extrusion 100. A groove 73 is positioned on the top surface of extrusion 100, and a sidewall 79 is included as well. Air flow channel 78 is included beneath the box beam shape to allow for the flow of air to dissipate heat generated by the aluminum conductors in the tether.

Figure 4B:
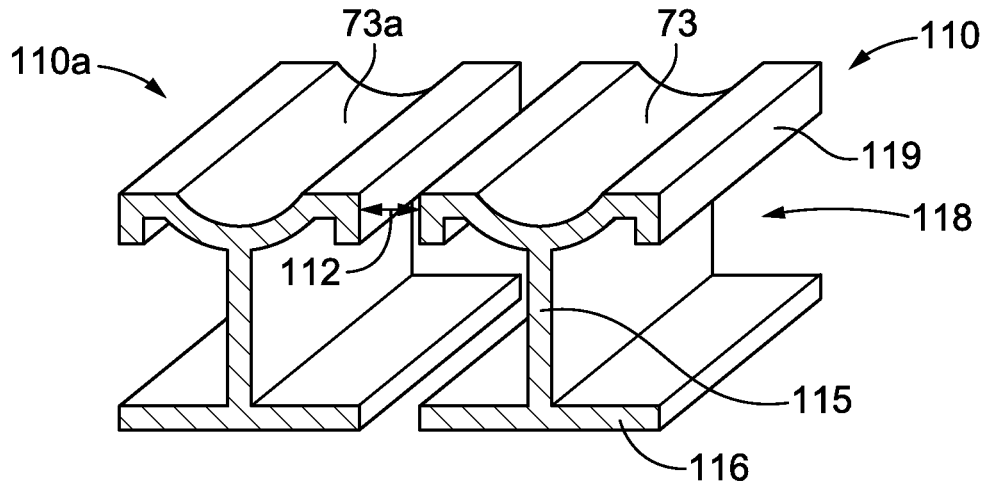
FIG. 4B is a perspective cross-sectional view of extrusion 110, according to an example embodiment.

FIG. 4B is an alternate example extrusion 110 having cross-section 115 that has an I-beam layout that may be used for simplicity, yet still provide adequate compressive strength. Furthermore, the use of an I-beam layout also minimizes the amount of material required for the extrusion 110. A groove 73 is positioned on the top surface of extrusion 110, and a sidewall 119 is included as well. An air flow channel 118 is included on either side of the I-beam shape to allow for the flow of air to dissipate heat generated by the aluminum conductors in the tether. In addition, an adjacent wrap of the extrusion 110a is shown positioned next to extrusion 100, with adjacent groove 73a on a top surface thereof. A spacing 112 may be provided between extrusion 100 and the adjacent wrap of the extrusion 110a. The spacing 112 may be adjusted to allow for additional air flow around the tether, as desired. The spacing 112 may be formed by attaching the spiral extrusions to the drum surface in such a manner that a gap is left between the adjacent wraps of the extrusion.

Figure 4C:
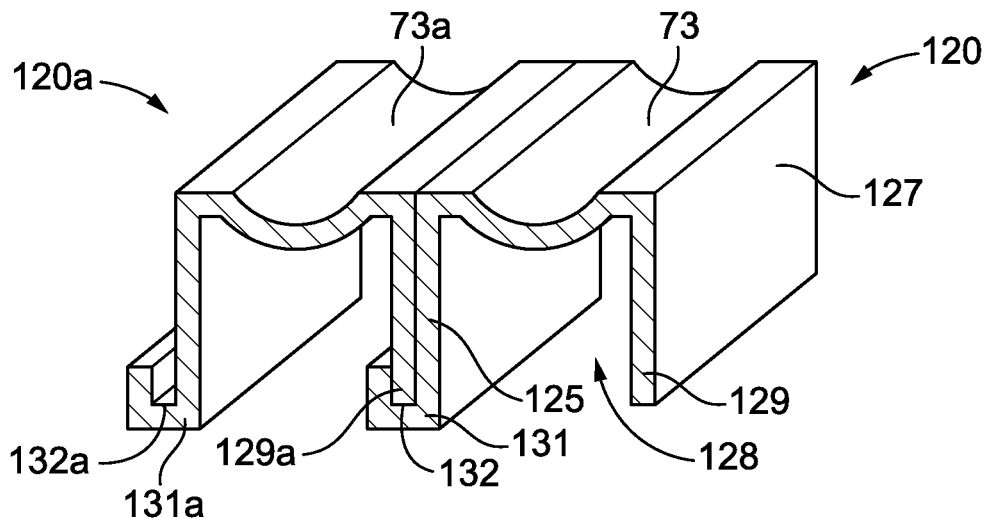
FIG. 4C is a perspective cross-sectional view of extrusion 120, according to an example embodiment.

FIG. 4C is another alternate example extrusion 120 having cross-section 125 with an M-shape layout. A groove 73 is positioned on the top surface of extrusion 120, and a sidewall 127 is included as well. An air flow channel 128 is positioned beneath groove 73 to allow for the flow of air to dissipate heat generated by the aluminum conductors in the tether. The M-shape cross-section 125 is advantageous because there is no base so that air may flow more easily beneath the groove 73 and tether. The M-shape cross-section of extrusion 120 may incorporate a locking mechanism, in which each wrap of the extrusion is able to fit into a slot on the previous wrap. In particular, the locking mechanism is in the lower left side 131 of the M-shape cross-section 125, in the form of a groove 132 into which the lower right portion 129a of the M-shape cross-section of the adjacent wrap of the extrusion 120a would fit into. In some embodiments, the locking mechanism could include a press fit, where the lower right portion of the M-shape cross-section 129a is press fit into the groove 132 on the lower left side 131 of the M-shape cross-section 125 in the adjacent wrap of the extrusion 120, tightly fitting together adjacent wraps of the extrusion 120 and 120a. In this example, adjacent wrap of the extrusion 120a includes a groove 73a on an upper surface of extrusion 120a, and includes a lower left portion 131a that it includes a groove 132a into which the lower right portion of a next adjacent wrap of the extrusion (not shown) may be positioned.

In some embodiments, the sides of the extrusion may be scalloped or drilled with transverse holes such that air can move through the adjacent wraps of the extrusion. In addition, because the shape of the extrusion extends above the drum frame and heat is only generated by the tether, buoyancy convection will drive air flow between the gaps between adjacent wraps of the extrusion and up the outside and over the tether, bringing new air into the boundary layer to help cool the tether.

The extrusions 100, 110, and 120 may be formed of extruded aluminium which is a strong, lightweight material that is easily extruded. However, in some embodiments a composite or plastic material could be used.

Figure 5A:
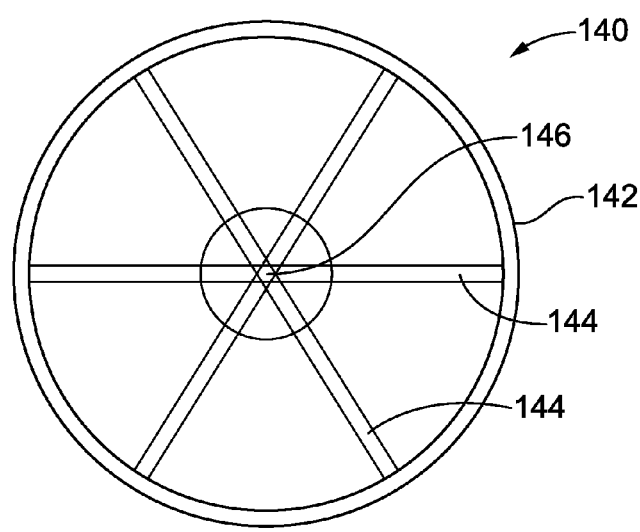
FIG. 5A is a side view of drum frame 140, according to an example embodiment.

While many types of drum frames are possible, as shown in FIG. 5A, a simple drum frame 140 may be constructed of steel tubes or plates 142 over which the extrusion is wrapped. For example the tubes could extend in a direction parallel to the axis 146 of the drum frame 140, and be attached to spokes 144. The extrusion might be welded, riveted, taped, bolted, glued, or attached through some other means to hold the extrusion in place on the surface 142 of drum frame 140. The extrusion itself is made thick enough and of high stiffness profiles so that only a relatively small number of framing tubes may be used for the drum frame 140. As a result, gaps may be provided between the tubes to allow for flow of air through the drum frame 140.

Figure 5B:
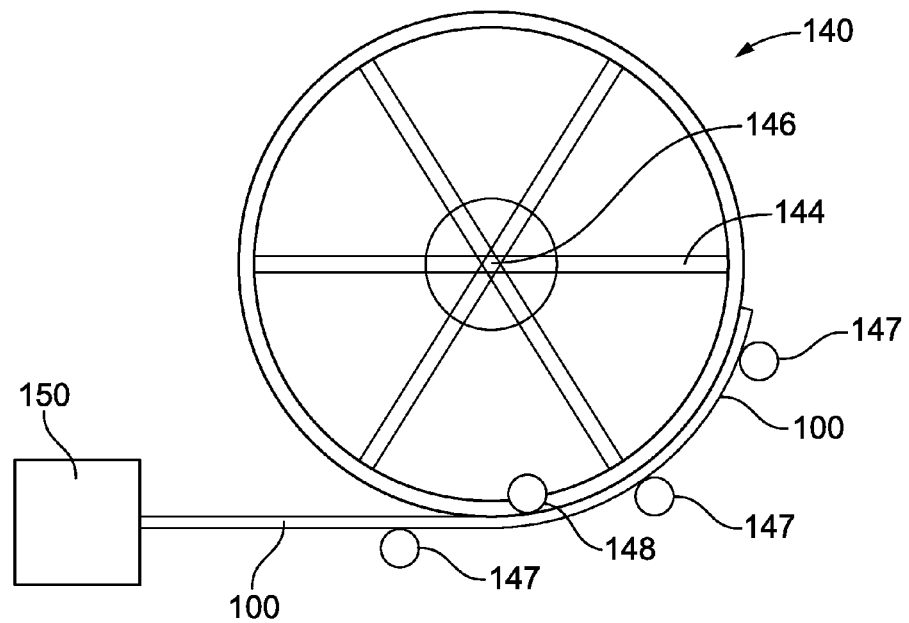
FIG. 5B is a side view showing extrusion 100 being wrapped onto drum frame 140 after exiting extruder 150.

As illustrated in FIG. 5B, an extrusion 100 may be wound over the drum frame 140 as the extrusion 100 exits an extruder 150 using a tube roller 147 and 148 by rotating drum frame 140 about drum axis 146. Because of limitations on the size of the extrusion machines, the extrusion for the drum surface may be constructed of a number of separate lengths of extrusions that are joined together at their respective ends to form a continuous spiral over the drum frame 140.

Figure 5C:
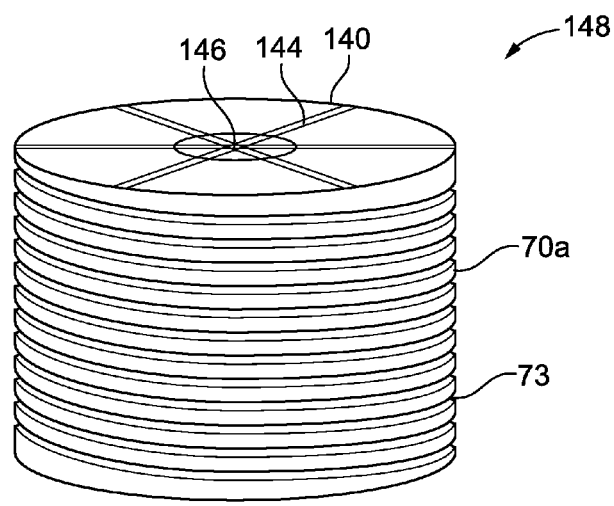
FIG. 5C shows drum frame 140 having extruded drum surface 70a, according to an example embodiment.

FIG. 5C illustrates drum 148 constructed of drum frame 140 having an extruded surface 70a with spiral grooves 73 shown formed of an extrusion that has been wound onto drum frame 140. The use of an aluminum extrusion for the surface 70a of the drum 148 has a number of advantages. For example, an extruded section is inexpensive to manufacture because extrusions are faster and less wasteful of material than machined surfaces. In addition, the extrusion may have a variety of cross-sections beneath the cradle portion or grooves 73 of the extrusion, such as those depicted in FIGS. 4A-4C. As noted above, spacing between adjacent wraps of the extrusion, air flow channels in the cross-section of the extrusion, and/or transverse holes in the extrusion may be used to provide air flow that may dissipate heat from the surface of the drum where the tether is stored.

The drum 148 must also have sufficient strength to withstand the compressive forces of the tether caused by the weight and tension of the tether. The present embodiments may include spokes 144 on the drum frame 140 that provide compressive strength to the drum 148. Moreover, the extrusion itself actually provides a lightweight eggshell-like surface capable of withstanding significant compressive forces, eliminating the need for a strong, heavy drum frame. Accordingly, the example embodiments provide a strong, but lightweight drum 148 that is easy to manufacture.

In addition, because of the minimal drum frame members required and the ability to provide gaps between adjacent wraps of the extrusion, air may flow all the way through the drum frame from one side to the other to cool the extrusion and tether.

Figure 6:
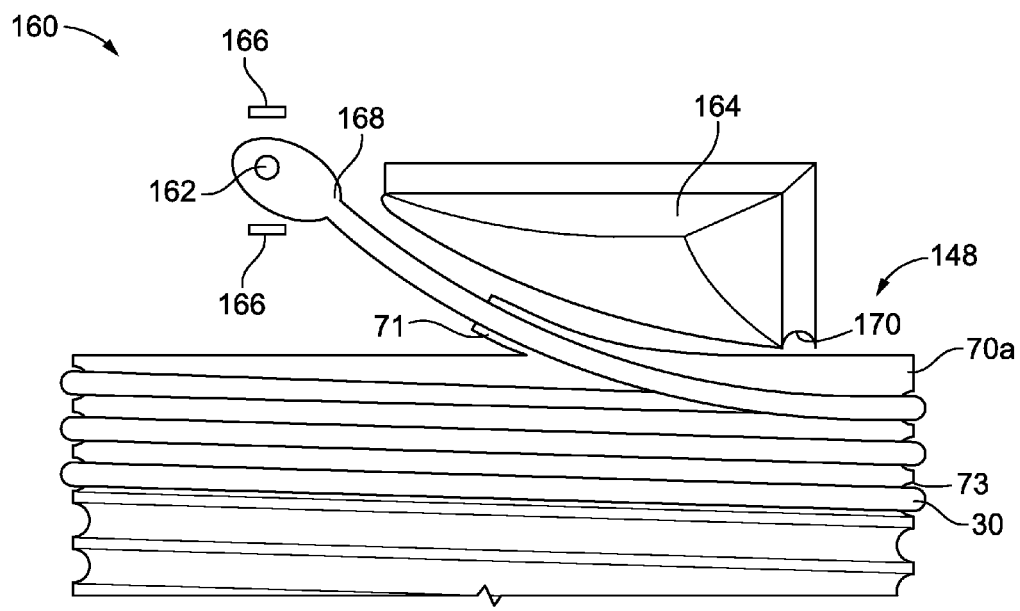
FIG. 6 shows tether 39 as it is wound onto drum frame 140, according to an example embodiment.

As illustrated in FIG. 6, a levelwind 164 may be used to guide the tether 30 onto the extruded surface 70a of drum 148 using tether guide 170. In some embodiments, the levelwind 164 may be inset within the drum. In designs with the levelwind winding onto a constant helix, the drum requires cutouts to fit the levelwind, as the levelwind comprises large bearings which must carry tether loads during flight. However, in an embodiment using an extrusion for the drum surface, the levelwind 164 may be positioned above the drum as shown in FIG. 6. The levelwind 164 may be positioned above the majority of the drum, with the end of the extrusion 71 angled to create a variable helix at the lead-in of the tether 30 while winding the tether 30 onto the drum 148. As the tether is wound onto the drum, the levelwind is moved along the surface of the drum, either through movement of the levelwind across the drum surface, or movement of the drum surface beneath the levelwind. In this example, an end of tether 30 is shown attached to a gimbal 166, and stinger 168 where the end of the tether is rotatable about gimbal axis 162.

Another benefit of using an extrusion for the drum surface is that different extrusion segments could be used to form the extrusion. In particular, in some embodiments the end of the tether nearest the aerial vehicle may be faired to be more aerodynamic, or shaped differently from the other end of the tether, which may be circular. The aerodynamics of the tether is far more important near the aerial vehicle than it is near the ground. As a result, a first segment of the extrusion could be shaped to cradle the end of the tether nearest the ground, and the second segment of the extrusion could be shaped to cradle the differently shaped faired portion of the tether nearest the aerial vehicle. In addition, the spacing between adjacent wraps of the first segment of the extrusion could be closer together than the spacing between adjacent wraps of the second segment of the extrusion if desired.

Figure 7:
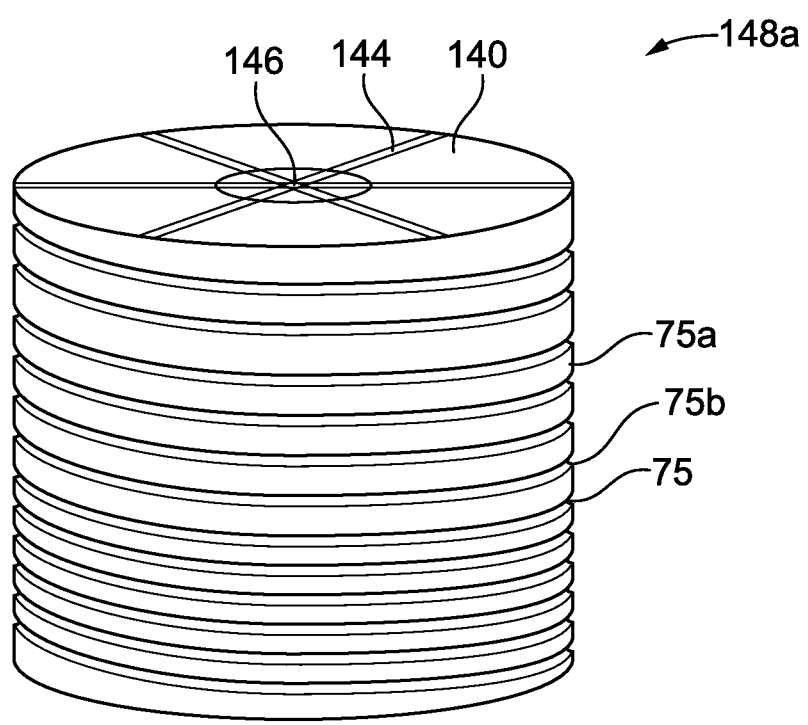
FIG. 7 shows drum frame 140 having a drum surface with a first spacing between wraps of the extrusion for a portion of the drum and a second spacing for wraps of the extrusion for a different portion of the drum.

FIG. 7 illustrates a drum 148a having a first set of grooves 75 on the drum surface 75a with a first spacing between adjacent wraps of the extrusion, and a second set of grooves 75b, having a second larger spacing between adjacent wraps of the extrusion. Further, the grooves 75 could differ in shape from grooves 75b to accommodate a portion of a tether having a different cross-section than a portion of the tether that will be wound onto grooves 75b.

Figure 8:
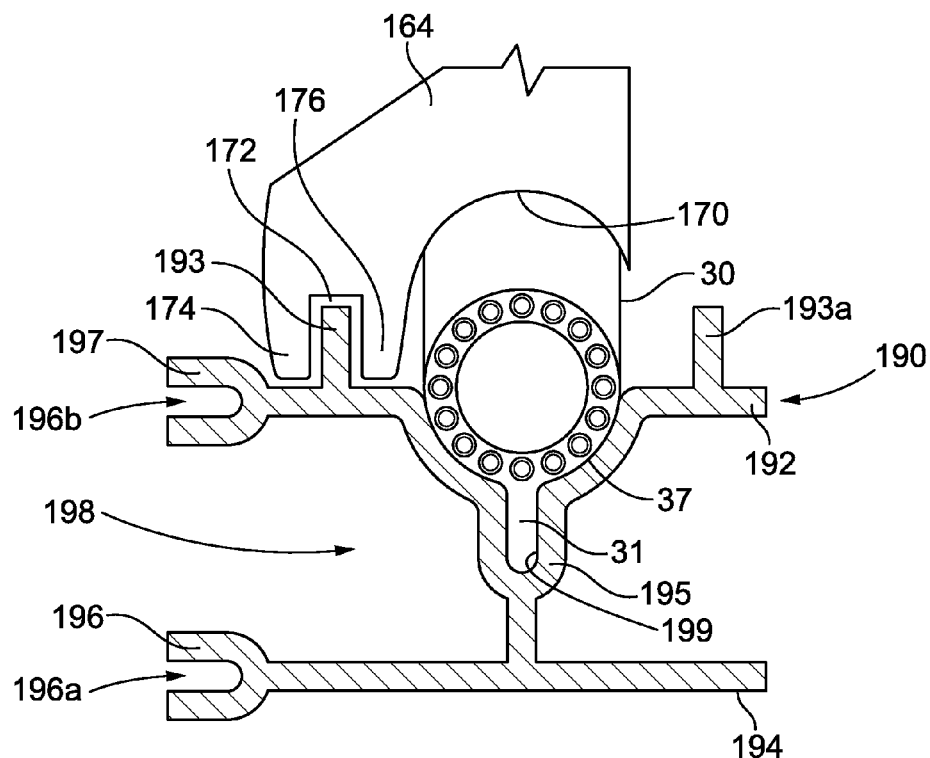
FIG. 8 shows a side cross-sectional view of tether 30 positioned between levelwind 164 and extrusion 190 with an upwardly extending guide rail 172 positioned within slot 172 in extension 174 of levelwind 164.

As illustrated in FIG. 8, an alternate extrusion 190 may be used having a cross-section 195. The bottom left side 196 of the cross-section 195 includes a first horizontally extending slot 196a and the bottom right side 194 of cross-section 195 includes a horizontally extending member adapted to fit within slot 196a of a previous adjacent wrap of extrusion 190. In addition, the upper left side 197 of the cross-section 195 includes a second horizontally extending slot 196b and the upper right side 192 of cross-section 195 includes a horizontally extending member adapted to fit within slot 196b of a previous adjacent wrap of extrusion 190. Using slots 196a and 196b, adjacent wraps of extrusion 190 may be secured to a prior wrap of extrusion 190.

In addition, the levelwind 164 may take advantage of other features of extrusion 190 to properly wind the tether 30 onto the extrusion 190. In particular, as the tether guide 170 of levelwind 164 is positioned over the tether 30 and groove 37, the extrusion 190 may be provided with an upwardly extending guide rail 193. The levelwind 164 may include an extension 174 having a slot 172 formed between extension 174 and inner portion of extension 176 that fits over the guide rail 193 to properly guide the levelwind 164 along as the tether 30 is wound onto the groove 37. A second upwardly extending guide rail 193a could also be provided adapted for positioning within another slot on the opposite side of the levelwind (not shown).

Moreover, a non-circular tether itself may be used to guide the tether onto the grooves in the extruded drum surface. In particular, as shown in FIG. 8, tether 30 may include an extension 31 adapted to fit within a slot 199 within groove 37 of extrusion 190. Thus, the extension 31 of tether 30 cooperatively with slot 199 within groove 37 of extrusion 190 may be used to guide the tether 30 onto the groove 37.

Figure 9:
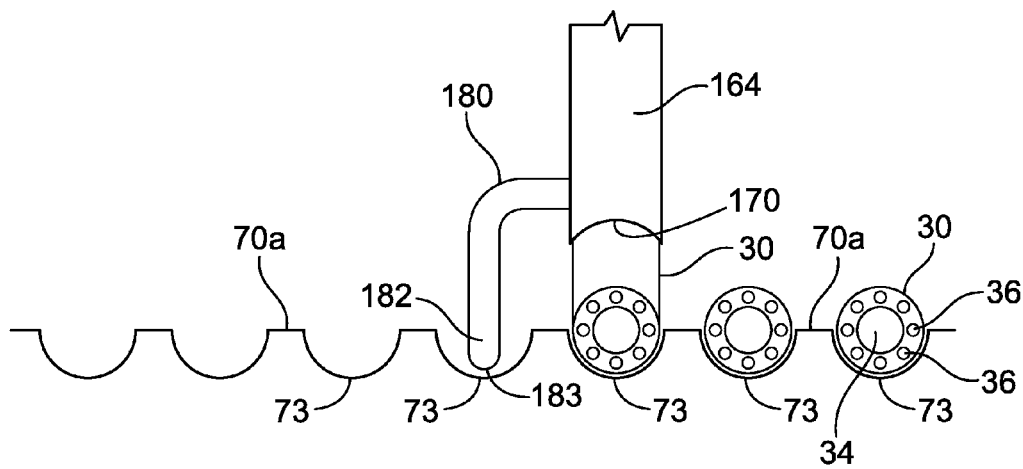
FIG. 9 shows a cross-sectional side view of tether 30 positioned between levelwind 164 and drum surface 70a, with an extension guide 180 attached to levelwind 164 extending into groove 73 adjacent tether 30.

Alternately, as shown in FIG. 9, the levelwind 164 may include an extension 180 that includes a downwardly extending extension guide 182 having an end 183 that rides in an adjacent groove of the extrusion next to where the tether 30 is being wound to insure the levelwind 164 is properly winding the tether 30 onto the grooves 73. The extension guide 182 is used to guide the levelwind 164 along as the tether 30 is wound onto the grooves 73.

4. Example Method of Forming a Drum Having an Extruded Surface

Figure 10:
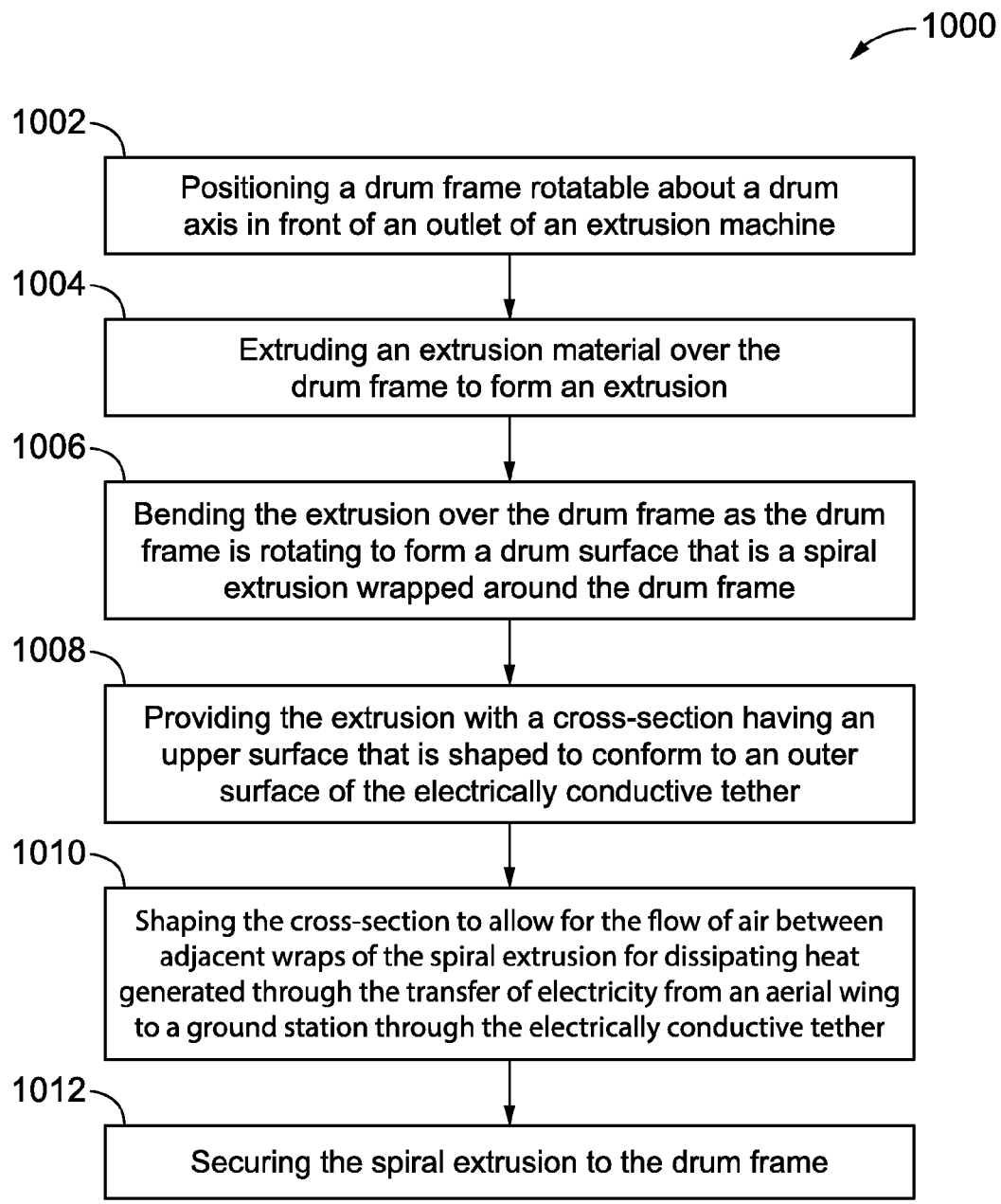
FIG. 10 is a method, according to an example embodiment.

FIG. 10 shows a method 1000 that may be used for forming a drum having an extruded surface including the step 1002 of positioning a drum frame rotatable about a drum axis in front of an outlet of an extrusion machine, the step 1004 of extruding an extrusion material over the drum frame, and the step 1006 of bending the extrusion over the drum frame as the drum frame is rotating to form a drum surface that is a spiral extrusion wrapped around the drum frame.

Method 1000 may further include the step 1008 of providing the extrusion with a cross-section having an upper surface that is shaped to conform to an outer surface of the electrically conductive tether, the step 1010 of shaping the cross-section to allow for the flow of air between adjacent wraps of the spiral extrusion for dissipating heat generated through the transfer of electricity from an aerial wing to a ground station through the electrically conductive tether, and the step 1012 of securing the spiral extrusion to the drum frame.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A drum for storing an electrically conductive tether having a first end secured to an aerial vehicle and a second end secured to a ground station, comprising:
    a drum frame rotatable about a drum axis;
    a drum surface positioned over the drum frame comprising a spiral extrusion wrapped around the drum frame;
    wherein the extrusion has a cross-section having an upper surface that is shaped to conform to an outer surface of the electrically conductive tether; and
    wherein a spacing is provided which allows air flow between longitudinally extending sides of adjacent wraps of the spiral extrusion, wherein the longitudinally extending sides of adjacent wraps are not in contact with each other.

2. The drum of claim 1, wherein a spacing is provided between the sides adjacent wraps of the spiral extrusion.

3. The drum of claim 1, wherein the cross-section has a hollow, box-shaped cross-section.

4. The drum of claim 1, wherein the cross-section has a downwardly extending leg beneath the upper surface.

5. The drum of claim 1, wherein the cross-section has a slot positioned on a leading edge of the cross-section into which a portion of a trailing edge of the next adjacent wrap fits within to secure successive wraps of the spiral extrusion together.

6. The drum of claim 5, wherein the slot comprises an extension on the leading edge of the cross-section that forms a vertical slot into which a downwardly extending leg on the trailing edge of the next adjacent wrap fits within.

7. The drum of claim 5, wherein the slot comprises a first slot extending horizontally from the leading edge of the cross-section into which a first horizontal extending portion on the trailing edge of the next adjacent wrap fits within.

8. The drum of claim 7, further including a second slot located below the first slot, the second slot extending horizontally from the leading edge of the cross-section into which a second horizontally extending portion on the trailing edge of the next adjacent wrap fits within.

9. The drum of claim 1, wherein the extrusion comprises a first section having a first cross-section and a second section having a second cross-section that is different from the first cross-section.

10. The drum of claim 9, wherein the first section has an upper surface that is shaped to conform to an outer surface of a first portion of the tether and the second section has an upper surface that is shaped to conform to an outer surface of a second portion of the tether that is shaped differently than the outer surface of the first portion of the tether.

11. The drum of claim 1, wherein the extrusion comprises a first section having a first spacing between successive wraps of the extrusion and a second section having a second spacing between successive wraps of the extrusion that is different from the first spacing.

12. The drum of claim 1, wherein a lead-in portion of the extrusion is angled outwardly.

13. A drum for storing an electrically conductive tether having a first end secured to an aerial vehicle and a second end secured to a ground station, comprising:
   a drum frame rotatable about a drum axis;
   a drum surface positioned over the drum frame comprising a spiral extrusion wrapped around the drum frame;
   wherein the extrusion has a cross-section having an upper surface that is shaped to conform to an outer surface of the electrically conductive tether;
   wherein the extrusion is adapted for dissipating heat generated through a transfer of electricity from the aerial vehicle to the ground station through the electrically conductive tether; and
   wherein transverse holes are provided in the spiral extrusion to allow for the flow of air beneath the upper surface of the extrusion.

14. A drum for storing an electrically conductive tether having a first end secured to an aerial vehicle and a second end secured to a ground station, comprising:
   a drum frame rotatable about a drum axis;
   a drum surface positioned over the drum frame comprising a spiral extrusion wrapped around the drum frame;
   wherein the extrusion has a cross-section having an upper surface that is shaped to conform to an outer surface of the electrically conductive tether;
   wherein the extrusion is adapted for dissipating heat generated through a transfer of electricity from the aerial vehicle to the ground station through the electrically conductive tether; and
   wherein a levelwind is positioned over the drum and the levelwind comprises a tether guide adapted for positioning over a groove in a wrap of the extrusion and an extension guide attached to the tether guide that is adapted to ride in an adjacent or forward groove of the extrusion when the tether is wound onto the drum.

15. The drum of claim 14, wherein the cross-section of the extrusion includes a first upwardly extending guide rail adjacent a tether groove and the levelwind comprises a tether guide adapted for positioning over a groove in a wrap of the extrusion and a first extension attached to the tether guide adapted to ride against the first upwardly extending guide rail when the tether is wound onto the drum.

16. The drum of claim 15, wherein the first extension comprises a slot into which the first upwardly extending guide rail fits within when the tether is wound onto the drum.

17. The drum of claim 15, wherein the cross-section of the extrusion includes a second upwardly extending guide rail adjacent an opposite side of the tether groove than the first guide rail and the levelwind further includes a second extension adapted to ride against the second upwardly extending guide rail when the tether is wound onto the drum.

18. A drum for storing an electrically conductive tether having a first end secured to an aerial vehicle and a second end secured to a ground station, comprising:
   a drum frame rotatable about a drum axis;
   a drum surface positioned over the drum frame comprising a spiral extrusion wrapped around the drum frame;
   wherein the extrusion has a cross-section having an upper surface that is shaped to conform to an outer surface of the electrically conductive tether;
   wherein the extrusion is adapted for dissipating heat generated through a transfer of electricity from the aerial vehicle to the ground station through the electrically conductive tether;
   wherein a cross-section of the electrically conductive tether is non-circular and includes an outward extension;
   wherein the upper surface of the extrusion includes a downwardly extending slot adapted to receive the outward extension on the tether; and
   wherein the outward extension and the downwardly extending slot cooperate to guide the tether onto the drum when the tether is wound onto the drum.

19. An airborne wind turbine system, comprising:
   an aerial vehicle;
   an electrically conductive tether having a first end secured to the aerial vehicle and a second end secured to a ground station;
   a drum frame rotatable about a drum axis, the drum frame positioned with the ground station;
   a drum surface positioned over the drum frame comprising a spiral extrusion wrapped around the drum frame;
   wherein the extrusion has a cross-section having an upper surface that is shaped to conform to an outer surface of the electrically conductive tether;
   wherein the cross section is shaped to allow for a flow of air between longitudinally extending sides of adjacent wraps of the spiral extrusion; and
   wherein a spacing is provided which allows air flow between the longitudinally extending sides of adjacent wraps of the spiral extrusion, wherein the longitudinally extending sides of adjacent wraps are not in contact with each other.

20. A method of forming a drum for storing an electrically conductive tether, comprising the steps of:
   positioning a drum frame rotatable about a drum axis in front of an outlet of an extrusion machine;
   extruding an extrusion material over the drum frame to form an extrusion;
   bending the extrusion over the drum frame as the drum frame is rotating to form a drum surface that is a spiral extrusion wrapped around the drum frame;
   providing the extrusion with a cross-section having an upper surface that is shaped to conform to an outer surface of the electrically conductive tether;
   providing a spacing which allows air flow between longitudinally extending sides of adjacent wraps of the spiral extrusion, wherein the longitudinally extending sides of adjacent wraps are not in contact with each other; and
   securing the spiral extrusion to the drum frame.

* * * * *